No. 3,951. REISSUED MAY 3, 1870.
B. S. ROBERTS.
BREECH LOADING FIREARM.
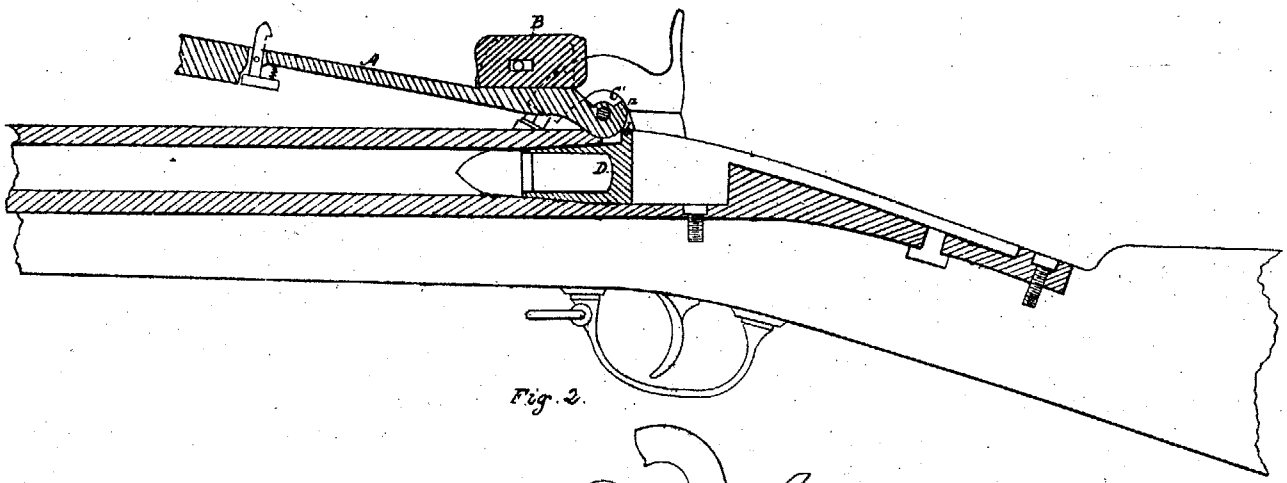
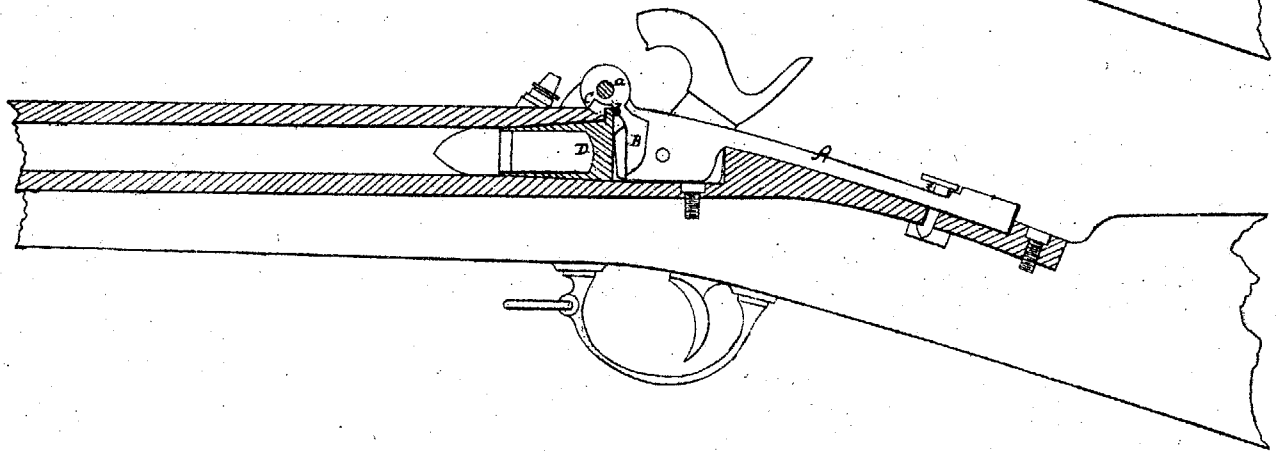
Witnesses:
P. Thompson
Echo Schaffer
Inventor.
B. S. Roberts

UNITED STATES PATENT OFFICE.

BENJAMIN S. ROBERTS, OF UNITED STATES ARMY.

IMPROVEMENT IN BREECH-LOADING FIRE-ARMS.

Specification forming part of Letters Patent No. 36,531, dated September 23, 1862; reissue No. 2,067, dated September 5, 1865; reissue No. 3,951, dated May 3, 1870.

DIVISION NO. 1.

*To all whom it may concern:*

Be it known that I, BENJAMIN S. ROBERTS, of the United States Army, have invented a new and useful Improvement in Breech-Loading Fire-Arms; and I do hereby declare that the following is a full, clear, and exact description thereof, reference being had to the accompanying drawings and the letters of reference marked thereon forming a part of this specification, in which—

Figure 1 is a central sectional longitudinal view of a breech-loading fire-arm, designed for metallic cartridges, showing the chamber or cartridge-seat in the rear end of the barrel, slightly tapering from the breech forward, with a tapering metallic cartridge entered in the chamber, but not completely driven home, and showing also one form of mechanism by which a breech-loading gun, having a tapering cartridge-seat, may be closed for firing, and by which the empty cartridge-shell may be withdrawn from the gun after firing. Fig. 2 is a similar view of the same arm, showing the breech closed for firing and the cartridge driven home.

My invention relates to that class of breech-loading fire-arms designed and adapted for the use of cartridges having metallic cases, and consists in tapering the bore of the barrel, constituting the cartridge-seat, from the rear end forward, and combining with such tapering cartridge-seat suitable mechanism for opening and closing the breech, and a suitable device for starting or removing the cartridge-case that is operated by the movement of the said opening and closing mechanism.

It is well-known that when the cartridge-seat in a breech-loading arm is made entirely cylindrical, and a cartridge is used having a metallic case made to fit the bore so closely as to constitute it an efficient gas-check, the removing of such shell, after firing, is rendered difficult by reason of the shell being expanded by the explosion, and made to press against and adhere to the walls of the chamber, rendering it necessary to apply to the shell considerable force continuously until its whole length is removed from the gun. It is known also, that for the convenient entrance of a cartridge into the chamber of a breech-loader, the end embracing the bullet should be somewhat smaller than the bore of the breech. But if the chamber is of uniform diameter throughout its length, and the cartridge-case is tapered, the bullet end, not being supported by the walls of the chamber, is liable to be ruptured by the explosion of the cartridge, and the case, under such circumstances, not constituting an efficient gas-check, there will be an escape of gas from the breech. My invention obviates all these difficulties and objections in a very perfect manner.

To enable others skilled in the art to make and use my invention, I will proceed to describe one mode of constructing a fire-arm embodying such invention, with references to the drawings.

A is the barrel of the gun, having an open breech. B indicates the chamber or cartridge-seat, made somewhat tapering from the rear end forward, the taper extending about the length of the cartridge-case. C and D indicate the mechanism for closing and opening the breech, C being a lever pivoted to the barrel at *a*, made to swing backward and downward in the act of closing the gun-breech, and upward and forward in opening it. D is a breech-plug, constituting, with the part C to which it is connected, a breech-piece, designed to close down into the space between the breech of the barrel and the recoil shoulder E and close the gun, when it (the breech-piece) is swung backward and downward. F is a spur on the hinge of the breech-piece C D, which, when the gun-breech is closed, is swung to the front of the projection *c* on the butt of the cartridge-case, and which, when the breech is opened by raising and swinging forward the breech-piece C D, engages with the projection *c* and starts the case from the barrel when as is evident, the cartridge-seat being tapered, it will be free to drop out by merely elevating the muzzle of the gun, or it may be removed by the hand or otherwise.

I do not confine myself to the particular mechanism here described for opening and closing the breech, or that for starting the cartridge-case from its seat in the gun. Any other equivalent mechanism may be employed for the purpose, the only essential condition being that the device used to start the cartridge-shell from its seat in the barrel, shall be so connected with the mechanism employed for closing and opening the breech, that it shall be operated and made to start out the cartridge-case by the movement of such mechanism made in opening the breech.

What I claim, and desire to secure by Letters-Patent, is—

A tapering chamber or cartridge-seat in breech-loading fire-arms, when combined with a suitably-constructed and operating breech-piece for closing and opening the breech, and a device for extracting or starting the cartridge-case from the barrel that is operated by the movement of the breech-piece made in opening the breech, substantially as and for the purposes specified.

B. S. ROBERTS.

Witnesses:
J. P. FITCH,
J. E. BEDELL.